(12) United States Patent
Horton

(10) Patent No.: US 8,273,818 B2
(45) Date of Patent: Sep. 25, 2012

(54) FLAME RETARDANT ELASTOMER LATICES

(75) Inventor: Stephen D. Horton, Avon Lake, OH (US)

(73) Assignee: PolyOne Corporation, Avon Lake, OH (US)

( * ) Notice: Subject to any disclaimer, the term of this patent is extended or adjusted under 35 U.S.C. 154(b) by 123 days.

(21) Appl. No.: 12/744,016

(22) PCT Filed: Nov. 21, 2008

(86) PCT No.: PCT/US2008/084420
§ 371 (c)(1),
(2), (4) Date: May 20, 2010

(87) PCT Pub. No.: WO2009/067701
PCT Pub. Date: May 28, 2009

(65) Prior Publication Data
US 2010/0267875 A1 Oct. 21, 2010

Related U.S. Application Data

(60) Provisional application No. 60/989,471, filed on Nov. 21, 2007.

(51) Int. Cl.
*C08K 3/34* (2006.01)
(52) U.S. Cl. ......... 524/446; 524/436; 524/437; 524/445

(58) Field of Classification Search .................. 524/445, 524/446, 436, 437
See application file for complete search history.

(56) References Cited

U.S. PATENT DOCUMENTS

| | | | |
|---|---|---|---|
| 5,418,272 A | 5/1995 | Kawabata et al. | |
| 5,883,173 A | 3/1999 | Elspass | |
| 6,924,334 B1 | 8/2005 | Fukatani et al. | |
| 2003/0144401 A1 | 7/2003 | Ajbani | |
| 2005/0260404 A1 | 11/2005 | Iwade et al. | |
| 2009/0099293 A1 | 4/2009 | Morioka et al. | |

FOREIGN PATENT DOCUMENTS

WO WO2004074361 A 9/2004

OTHER PUBLICATIONS

Huifeng Zhang et al. J. Appl. Polym. Sci. 2005, 97, 844-849.*
Li-Qun Zhang et al. http://www.iccm-central.org/Proceedings/ICCM17proceedings/Themes/Nanocomposites/MULTIFUNC%20NANOCOMP/E3.13%20Zhang.pdf (Jul. 31, 2009).*

* cited by examiner

*Primary Examiner* — David W Wu
*Assistant Examiner* — Vu A Nguyen
(74) *Attorney, Agent, or Firm* — John H. Hornickel

(57) ABSTRACT

A non-halogenated elastomeric latex is disclosed, using as flame retardants, an aqueous dispersion of organoclay and a conventional non-halogenated flame retardant, of which less is needed than conventionally, because of the use of the organoclay. The latex can become a film, sheet, or other article.

12 Claims, No Drawings

FLAME RETARDANT ELASTOMER LATICES

CLAIM OF PRIORITY

This application claims priority from U.S. Provisional Patent Application Ser. No. 60/989,471 and filed on Nov. 21, 2007, which is incorporated by reference.

FIELD OF THE INVENTION

This invention concerns an aqueous latex of elastomer that is flame retardant because of the use of non-halogenated flame retardants.

BACKGROUND OF THE INVENTION

Aqueous latices of elastomer, usually styrene-butadiene rubber (SBR), are often used in applications requiring flame retardant properties, such as backings of carpet, draperies, and fabrics, whether woven or non-woven. In the past, flame retardant properties have been provided by halogenated additives such as chlorinated SBR latex or brominated additives, both in combination with antimony oxide.

Concerns about combustion of materials containing halogenated materials in an occupied building or other structure has caused a shift from halogenated flame retardant additives to non-halogenated compounds such as aluminum trihydrate (ATH). To provide adequate flame retardant properties, high loadings of ATH have been included in the SBR latex, which unfortunately diminishes other needed physical properties of the latex when formed as a backing on the carpet, draperies, or fabric, increases weight, costs, and disposal and recycling issues.

SUMMARY OF THE INVENTION

What the art needs is a SBR latex that contains non-halogen flame retardants and otherwise retains the physical properties of the SBR latex.

Unexpectedly, the present invention has solved this problem by using an organoclay as a non-halogenated flame retardant in combination with ATH at significantly lower concentrations so that the physical properties of the SBR latex are not otherwise diminished.

"Non-halogenated" means that there is no overt intention to have any halogen included in the composition of the flame retardant.

Thus, one aspect of this invention is a non-halogenated latex comprising: (a) an elastomer latex binder; (b) a non-halogen flame retardant selected from the group consisting of aluminum trihydrate, magnesium hydroxide, or combinations thereof; and an organoclay.

Desirably, the organoclay is an inorganic nanoclay intercalated with a multi-charged spacing/coupling agent comprising a multi-onium ion compound having at least one ammonium ion and at least one oxonium ion.

Also desirably, the organoclay is a dispersion where the organoclay is formed using an intercalant having both amino end groups and carboxylic end groups.

Another aspect of the present invention is a building material comprising the non-halogenated latex covering at least one surface thereof.

Features and advantages of the invention will be explained below while discussing the embodiments.

EMBODIMENTS OF THE INVENTION

Elastomeric Latices

Any conventional latex which when dried, has elastomeric properties, is a candidate for use in the present invention. Both elastomers and vulcanizates are contemplated, whether thermoplastic or thermoset in nature.

Non-limiting examples of thermoplastic elastomers include styrene block copolymers such as styrene-butylene-styrene (SBS), styrene-ethylene-butylene-styrene (SEBS), styrene-isoprene-styrene (SIBS), and terpolymers of ethylene, propylene, and a diene (EPDM).

Non-limiting examples of thermoplastic vulcanizates include a polyolefin continuous phase and a crosslinked EPDM, SBR, butyl rubber or polybutadiene discontinuous phase.

Non-limiting examples of other elastomeric latex solids include nitrile rubber (NBR), natural rubber (NR), polyurethane dispersions (PUD), acrylic polymers, styrenated acrylic polymers, and polyisoprene (IR).

Average particle sizes of the elastomer can range from about 10 nm to about 300 micrometers, and preferably from about 50 nm to about 500 nm.

The latex contains elastomeric solids content ranging from about 20% to about 70%, and preferably from about 40% to about 60%. The rest of the latex can be the carrier, which typically is water with surfactant and other optional ingredients.

Non-Halogenated Flame Retardants

Aluminum Trihydrate Aluminum trihydrate is a well-known, non-halogenated flame retardant. One feature of the present invention is that no one skilled in the art need replace her favorite commercial source of ATH; less is required because of the use of aqueous dispersion of organoclay being included in the latex as a second flame retardant.

Commercially available sources of ATH include Albemarle Corporation, Niknam Chemicals, Almatis, Inc. and J. M. Huber.

Magnesium Hydroxide Magnesium hydroxide is also a well-known, non-halogenated flame retardant. As with ATH, a feature of the present invention is that a favorite commercial source of magnesium hydroxide can still be used. But less is required because of the use of aqueous dispersion of organoclay being included in the latex as a second flame retardant.

Commercially available sources of magnesium hydroxide include Martin Marietta, Albemarle Corporation, Sakai and AMMAT Technology Co., LTD.

Aqueous Dispersion of Organoclay

The organoclay is introduced into the elastomer latex via an aqueous dispersion. The details of the aqueous dispersion of organoclay can be found in co-pending, co-owned U.S. Patent Application 60/969,632, incorporated by reference herein, which will have become co-pending, co-owned PCT Patent Application PCT/US2008/074,390. A summary of that description is provided here.

Carrier for Aqueous Dispersion

Any aqueous-based carrier is a candidate for use in the aqueous dispersion of organoclay. There may be reasons why one of ordinary skill in the art of polymer coating systems would select pure or deionized water as the carrier or would select a mixture of water and a volatile organic solvent, depending on the coating to be formed on a substrate. Preferably, water is used. More preferably, deionized water is used.

Organoclays

Organoclay is obtained from inorganic clay from the phyllosilicate family, which have a unique morphology, featuring one dimension in the nanometer range. Montmorillonite clay is the most common member of the phyllosilicate clay family. The montmorillonite clay particle is often called a platelet, meaning a sheet-like structure where the dimensions in two directions far exceed the particle's thickness.

Any swellable layered silicate material that sufficiently ion-exchanges with an onium ion spacing agent is a candidate for the clay portion of the organoclay. Preferably, the ion exchange at the internal platelet faces can increase the interlayer spacing between adjacent phyllosilicate platelets at least about 30 nm, preferably at least about 0.5 nm. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Inorganic clay becomes commercially significant if intercalated with an organic intercalant to become an organoclay. An intercalate is a clay-chemical complex wherein the clay gallery spacing has increased, due to the process of surface modification by an intercalant. Under the proper conditions of temperature and shear, an intercalate is capable of exfoliating in a resin matrix, such as LLDPE or other polyethylenes, or in the circumstance of this invention, the aqueous-based carrier.

An intercalant is an organic or semi-organic chemical capable of entering the montmorillonite clay gallery and bonding to the surface. Exfoliation describes a dispersion of an organoclay (surface treated inorganic clay) in a matrix. In use in this invention, organoclay is exfoliated at least to some extent.

In exfoliated form, organoclay platelets have a flexible sheet-type structure which is remarkable for its very small size, especially the thickness of the sheet. The length and breadth of the particles range from 1.5 μm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

The type of specific intercalants used by Nanocor, Inc. in its commercial products appear to be trade secrets. Nonetheless, by comparing its trade literature with its patent literature, it appears that the intercalant specifically useful for the present invention is a multi-charged spacing/coupling agent comprising a multi-onium ion compound having at least one ammonium ion and at least one oxonium ion. One organoclay commercially available from Nanocor, Inc. that utilizes a multi-charged spacing/coupling agent comprising a multi-onium ion compound having at least one ammonium ion and at least one oxonium ion is sold as Nanomer brand I.24TL organoclay, specifically identified to be suitable as an in-reactor grade for use with polyamide.

As explained in U.S. Pat. No. 6,906,127 (Liang et al.) at Col. 8, Line 52 to Col. 8, Line 67; Col. 9, Line 1 to Line 20; and Example 1, the text of which is specifically incorporated by reference herein, the preferred multi-charged spacing/coupling agent can be a multi-onium ion compound that include at least two primary, secondary, tertiary or quaternary ammonium, phosphonium, sulfonium, and/or oxonium ions according to Formula 2 shown at Col. 8, Line 60. As explained at Example 1, the intercalant used was protonated amino-dodecanoic acid.

Therefore, commercially available organoclays for the present invention are intercalates which employ intercalants having the following formula:

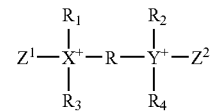

wherein $X^+$ is an ammonium radical, wherein $Y^+$ is an oxonium radical, wherein R is an alkylene, aralkylene or substituted alkylene charged atom spacing moiety, straight or branched, preferably ranging from $C_3$ to $C_{24}$ and mixtures of moieties thereof, wherein $R_1$, $R_2$, $R_3$, and $R_4$ are moieties, same or different, selected from the group consisting of hydrogen, alkyl, aralkyl, benzyl, substituted benzyl, e.g., straight or branched chain alkyl-substituted and halogen-substituted; ethoxylated or propoxylated alkyl; ethoxylated or propoxylated benzyl, e.g., 1-10 moles of ethoxylation or 1-10 moles of propoxylation, and wherein $Z^1$ and $Z^2$, same or different, may be non-existent, or may be any of the moieties described for $R_1$, $R_2$, $R_3$ or $R_4$ or one or more positively charged atoms or onium ion molecules.

More particularly, this invention benefits from commercially available organoclays that are taught to have intercalants with both amino end groups and carboxylic end groups.

Most preferably, this invention benefits from protonated amino-carboxylic acid intercalated phyllosilicate, especially montmorillonite, and even more especially when the carboxylic acid has from about 8 to about 16 carbon atoms and preferably about 10 to about 14 carbon atoms.

Optional Additives to the Aqueous Dispersion

The organoclay dispersion can include conventional plastics additives in an amount that is sufficient to obtain a desired processing or performance property for the ultimate polymer coating system, but in a manner that does not disrupt the dispersion of the organoclay into the aqueous based carrier.

The amount should not be wasteful of the additive nor detrimental to the processing or performance of the compound. Those skilled in the art of liquid thermoplastics compounding, without undue experimentation but with reference to such treatises as *Plastics Additives Database* (2004) from Plastics Design Library (www.williamandrew.com), can select from many different types of additives for inclusion into the organoclay dispersion of the present invention.

Non-limiting examples of optional additives include adhesion promoters; biocides, if any, (antibacterials, fungicides, and mildewcides), defoaming agents; anti-static agents; bonding, blowing and foaming agents; dispersants; fillers and extenders; fire and flame retardants and smoke suppressants, if any; impact modifiers; initiators; lubricants; micas; pigments, colorants and dyes; plasticizers; polymer resins in particulate form; processing aids; release agents; silanes, titanates and zirconates; slip and anti-blocking agents; stabilizers; stearates; ultraviolet light absorbers; viscosity regulators; waxes; and combinations of them.

Table 1 shows ranges of acceptable, desirable, and preferred weight percents of the various ingredients for addition to a mixer, relative to the total weight of the organoclay dispersion, all being expressed as approximate values. Because the additives are optional, the low end of each range is zero.

TABLE 1

Weight Percent of Ingredients in Aqueous Organoclay Dispersion

| Ingredients | Acceptable | Desirable | Preferred |
|---|---|---|---|
| Aqueous Based Carrier | 10-90 | 40-80 | 50-60 |
| Organoclay | 10-90 | 20-60 | 40-50 |
| Optional Additives | 0-15 | 0-10 | 0-5 |

Alternatives for Flame Retardant Additives

The non-halogenated flame retardant and the aqueous dispersion of organoclay can be added to the elastomer latex separately or together. If prepared to be added separately, then the advantage is that the relative ratio and overall levels of the two flame retardant components can be optimized for a given latex and application with respect to final product performance and cost. If prepared to be added together, then the advantage is fewer ingredients to be added to the latex at the time of final mixing.

Table 2 shows ranges of acceptable, desirable, and preferred weight percents of the various ingredients for addition to a mixer, relative to 100 parts of elastomer latex, all being expressed as approximate values. It should be noted that any of the optional additives which can be used in the aqueous dispersion of organoclay can also be included as optional additives at this point of manufacture. Because the additives are optional, the low end of each range is zero.

TABLE 1

Parts of Additives in 100 Parts of Elastomer Latex Binder

| Ingredients | Acceptable | Desirable | Preferred |
|---|---|---|---|
| Elastomer Latex Binder | 100 | 100 | 100 |
| Non-halogenated flame retardant | 5-70 | 5-35 | 10-20 |
| 40% Aqueous Dispersion of Organoclay | 1-7 | 1.5-6 | 3.5 |
| Optional Additives | 0-15 | 0-10 | 0-5 |

It should be noted that any reduction in non-halogenated flame retardant content below a conventional level will improve physical properties of the latex when formed as a film as a backing on a carpet, a wall covering, a fabric or the like.

Processing of Aqueous Dispersion and Latex

The preparation of compounds of the present invention is uncomplicated.

The aqueous dispersion used in the present invention can be made in batch operations using a mixer, such as a Cowels high speed mixer operating at ambient temperature. Order of ingredients promotes dispersion, beginning with the aqueous based carrier, followed sequentially by any optional dispersing aid, organoclay, and an optional anti-foaming agent. A flowable viscous liquid results.

The preparation of the latex is not substantially different, except that moderate mixing speed is used and the non-halogenated flame retardant, if separate from the aqueous dispersion of organoclay, is added before the organoclay. A flowable, less-viscous liquid results.

Usefulness of the Invention

An elastomeric latex of the present invention can be used to make films, sheets, coated surfaces, molded articles, etc.

Further embodiments of the invention are described in the following Examples.

EXAMPLES

Table 3 shows the ingredients used for the Examples and Comparative Examples. Table 4 shows the recipes of the aqueous dispersions of organoclay. Table 5 shows the recipes of the latices conditions and qualitative flame test results.

TABLE 3

Ingredients and Sources

| Ingredient Name | Commercial Source |
|---|---|
| Nanomer I.24TL protonated amino-carboxylic acid intercalated montmorillonite clay | Nanocor, Inc. of Arlington Heights, IL |
| Deionized Water | Various |
| SAG-330 polydimethylsiloxance antifoam emulsion | Momentive Performance Polymers of South Charleston, WV |
| Triton X-100 octylphenoxyethanol dispersant | Dow Chemical Co. of Midland, MI |
| Aquamix 103 ammonium caseinate rheology modifier | PolyOne Corporation of Avon Lake, OH |
| Surfynol CT-136 surfactant/dispersant | Air Products of Pittsburgh, PA |
| Micral 932 aluminum trihydrate (ATH) flame retardant | J M Huber Corporation of Atlanta, GA |
| Dow 8283 carboxylated styrene butadiene rubber (SBR) latex binder (~51% solids) | Dow Chemical Co. |
| Van Gel B Bentonite clay granular thickener/flame retardant | R T Vanderbilt of Norwalk, CT |

Table 4 shows the recipes of the aqueous organoclay dispersions. Example 1 did not include ATH flame retardant, whereas Example 2 did. Both Examples were mixed at ambient temperature at high speed in a Cowles type mixer to yield a flowable paste. The order of addition of ingredients for Example 1 was in the order listed below. The order of addition of ingredients for Example 2 was water, then rheology modifier, then surfactant, then flame retardant, and finally organoclay.

TABLE 4

Recipes of Aqueous Dispersions

| Ingredient Name | 1 | 2 |
|---|---|---|
| Deionized Water | 56.5 | 34.94 |
| Triton X-100 dispersant | 3.0 | — |
| Nanomer I.24TL organoclay | 40.0 | 7.15 |
| SAG-330 anti-foam | 0.5 | — |
| Aquamix 103 rheology modifier | — | 1.30 |
| CT-136 surfactant | — | 3.04 |
| ATH flame retardant | — | 53.57 |

Table 5 shows the recipes, in parts per hundred of latex, of the latices of Examples 3-10, compared variously with Comparative Examples A-D. Mixing of all Examples 3-10 and Comparative Examples B-D occurred in a laboratory scale Lightning mixer at ambient temperature and moderate speed.

The order of addition of ingredients was latex binder, then ATH flame retardant (except Example 10), and then variously, for Examples 3-7, and 9, the dispersion of Example 1; for Example 8, dispersion of inorganic bentonite clay; and for Example 19, the dispersion of Example 2.

To test the flame retardance of the Comparative Examples and Examples, films of each were made by drawing down the latices onto Mylar film and allowing them to dry for a period of about one week. The films were then removed and cut into strips approximately 1 cm wide by 10 cm long by about 0.2 cm thick. The strips were then hung vertically and ignited with a butane lighter by engaging the flame with the end of the strip Using the Comparative Examples A-C as the baseline, the relative time to ignition and rate of flame propagation up each strip was noted. The test was repeated at least two times for each Comparative Example and Example.

Table 5 also shows these results of comparative, qualitative flame testing for both time to ignition and pace of flame propagation.

Finally, a comparison of Comparative Example D to Examples 9 and 10 showed that both Examples 9 and 10 were superior to Comparative Example D (a repeat of Comparative Example B and representing conventional thinking). Also, Examples 9 and 10 were compared with each other and found equivalent. Example 9 represented one possible product, an aqueous dispersion of organoclay (a repeat of Example 3 and having an effective organoclay concentration of 1.32 parts—40% of Example 1). Example 10 represented a second possible product, an aqueous dispersion of both organoclay and ATH flame retardant (also having an effective organoclay concentration of 1.32 parts—7.15% of Example 2). Example 9 was combined with 10 parts of ATH, whereas the 10 parts of ATH for Example 10 was already included in the dispersion of Example 2—53.57% of Example 2. Thus, qualitatively, it did not matter whether the organoclay flame retardant and the ATH flame retardant were introduced separately to the latex or combined before introduction.

TABLE 5

Latex Recipes and Results

| Ingredient Name | A | B | 3 | 4 | 5 | 6 | C | 7 | 8 | D | 9 | 10 |
|---|---|---|---|---|---|---|---|---|---|---|---|---|
| Dow 8283 SBR latex binder | 100 | 100 | 100 | 100 | 100 | 100 | 100 | 100 | 100 | 100 | 100 | 100 |
| ATH flame retardant | — | 20 | 10 | 5 | 10 | 5 | 10 | 10 | 10 | 20 | 10 | — |
| Additive of Example 1 | — | — | 3.3 | 3.3 | 1.65 | 1.65 | — | 3.3 | — | — | 3.3 | — |
| Bentonite Clay | — | — | — | — | — | — | — | — | 1.3 | — | — | — |
| Additive of Example 2 | | | | | | | | | | — | — | 18.5 |
| Ignition Time | N/A | >>A | >B | ~B | >A; <B | >A; <B | N/A | >>C | ~C | N/A | >D; ~10 | >D; ~9 |
| Flame Propagation | N/A | >>A | >B | ~B | >A; <B | >A; <B | N/A | >>C | ~C | N/A | >D; ~10 | >D; ~9 |

Comparisons are made for Examples 3-6 against both Comparative Example A (unmodified latex) and Comparative Example B (latex and ATH at a conventional concentration); for Examples 7 and 8 against Comparative Example C; and for Examples 9 and 10 against Comparative Example D and each other.

First, a comparison of Comparative Example B to Comparative Example B confirmed the conventional thinking that the addition of 20 parts phr of ATH to SBR latex dramatically slowed time to ignition and pace of flame propagation. Example 4 showed equivalent performance as Comparative Example B with 25% of the ATH concentration and 3.3 parts phr of the aqueous organoclay dispersion of Example 1. Example 3 was superior to both Comparative Example B and Example 4, with the same amount of organoclay dispersion but twice the ATH concentration as Example 4. Examples 5 and 6 showed that halving the organoclay dispersion made both inferior to Comparative Example B.

Next, a comparison of Comparative Example C to Examples 7 and 8 showed the importance of the clay being an organoclay, not an inorganic clay. Example 7 was superior in performance to both Comparative Example C and Example 8.

The invention is not limited to the above embodiments. The claims follow.

What is claimed is:

1. A non-halogenated latex, comprising:
   (a) an elastomer latex binder;
   (b) a non-halogen flame retardant selected from the group consisting of aluminum trihydrate, magnesium hydroxide, or combinations thereof; and
   (c) an organoclay,
   wherein the organoclay is an aqueous organoclay dispersion, comprising
      (1) an aqueous based carrier and
      (2) an organoclay containing a multi-charged spacing/coupling agent comprising a multi-onium ion compound having at least one ammonium ion and at least one oxonium ion.

2. The latex of claim 1, wherein the elastomer latex binder is selected from the group consisting of elastomers and vulcanizates.

3. The latex of claim 2, wherein the elastomer latex binder is styrenic.

4. The latex of claim 3, wherein the elastomer latex is a styrene block copolymer, styrenated acrylic or a styrene-butadiene rubber.

5. The latex of claim 1, wherein the elastomer has an average particle size ranging from about 10 nm to about 300 micrometers.

6. The latex of claim 1, wherein the elastomer latex binder has an elastomer solids content ranging from about 20% to about 70%.

7. The latex of claim 1, wherein the amount of non-halogenated flame retardant in the latex ranges from about 5 parts to about 70 parts per 100 parts of elastomer latex binder.

8. The latex of claim 1, wherein the organoclay is formed using an intercalant having both amino end groups and carboxylic end groups.

9. The latex of claim 1, wherein the organoclay is an intercalate which employs an intercalant having the formula:

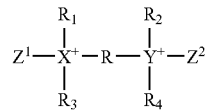

wherein $X^+$ is an ammonium radical, wherein $Y^+$ is an oxonium radical, wherein R is an alkylene, aralkylene or substituted alkylene charged atom spacing moiety, straight or branched, and mixtures of moieties thereof, wherein $R_1$, $R_2$, $R_3$, and $R_4$ are moieties, same or different, selected from the group consisting of hydrogen, alkyl, aralkyl, benzyl, substituted benzyl, ethoxylated or propoxylated alkyl, ethoxylated or propoxylated benzyl, and wherein $Z^1$ and $Z^2$, same or different, may be non-existent, or may be any of the moieties described for $R_1$, $R_2$, $R_3$ or $R_4$ or one or more positively charged atoms or onium ion molecules.

10. The latex of claim 2, wherein the elastomer has an average particle size ranging from about 10 nm to about 300 micrometers.

11. The latex of claim 2, wherein the elastomer latex binder has an elastomer solids content ranging from about 20% to about 70%.

12. The latex of claim 2, wherein the amount of non-halogenated flame retardant in the latex ranges from about 5 parts to about 70 parts per 100 parts of elastomer latex binder.

* * * * *